US010863576B2

(12) United States Patent
Pattan et al.

(10) Patent No.: US 10,863,576 B2
(45) Date of Patent: Dec. 8, 2020

(54) METHOD AND APPARATUS FOR MANAGING MCPTT SERVICE

(71) Applicant: Samsung Electronics Co., Ltd., Suwon-si (KR)

(72) Inventors: Basavaraj Jayawant Pattan, Bangalore (IN); Ho-Yeon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 15/765,405

(22) PCT Filed: Sep. 30, 2016

(86) PCT No.: PCT/KR2016/010999
§ 371 (c)(1),
(2) Date: Apr. 2, 2018

(87) PCT Pub. No.: WO2017/057962
PCT Pub. Date: Apr. 6, 2017

(65) Prior Publication Data
US 2018/0288827 A1 Oct. 4, 2018

(30) Foreign Application Priority Data

Oct. 1, 2015 (IN) ............................ 5274/CHE/2015
Sep. 29, 2016 (IN) ............................ 5274/CHE/2015

(51) Int. Cl.
*H04W 76/45* (2018.01)
*H04W 4/10* (2009.01)
(Continued)

(52) U.S. Cl.
CPC ......... *H04W 76/45* (2018.02); *H04L 65/1006* (2013.01); *H04L 65/4061* (2013.01);
(Continued)

(58) Field of Classification Search
CPC .................................................... H04W 76/45
See application file for complete search history.

(56) References Cited

U.S. PATENT DOCUMENTS

| 6,895,250 B1 | 5/2005 | Igarashi |
| 2005/0186970 A1* | 8/2005 | Yates ...................... H04W 4/10 455/456.5 |

(Continued)

OTHER PUBLICATIONS

US Department of Commerce, 'Separation of supplementary service, callback, requirements', S1-150107, 3GPP TSG-SA WG1 Meeting #69, Sanya, P.R. China, Jan. 23, 2015.

(Continued)

*Primary Examiner* — Ankur Jain
(74) *Attorney, Agent, or Firm* — Jefferson IP Law, LLP

(57) ABSTRACT

The present disclosure relates to an apparatus and a method for managing a Mission Critical Push-to-Talk (MCPTT). The apparatus comprises: a first MCPTT client configured to send an MCPTT request message to a second MCPTT client through a MCPTT server, and receive, from the second MCPTT client through the MCPTT server, a MCPTT response message in response to the MCPTT request message, wherein an MCPTT call in the MCPTT service is established between the first MCPTT client and the second MCPTT client by the MCPTT server.

20 Claims, 7 Drawing Sheets

(51) Int. Cl.
    *H04L 29/06*         (2006.01)
    *H04M 3/48*          (2006.01)
    *H04W 76/10*        (2018.01)

(52) U.S. Cl.
    CPC .............. *H04M 3/48* (2013.01); *H04W 4/10* (2013.01); *H04W 76/10* (2018.02)

(56) References Cited

U.S. PATENT DOCUMENTS

| | | | |
|---|---|---|---|
| 2007/0027993 A1* | 2/2007 | Schwagmann | H04L 65/4061 709/227 |
| 2009/0198768 A1 | 8/2009 | Gao et al. | |
| 2011/0119326 A1 | 5/2011 | Jolfaei | |
| 2017/0310761 A1* | 10/2017 | Enomoto | H04W 4/10 |

OTHER PUBLICATIONS

Blackberry UK Ltd., 'Configuring the MCPTT service', S6-150876, 3GPP TSG-SA WG6 Meeting #6, Vancouver, Canada, Aug. 12, 2015.

\* cited by examiner

[Fig. 1]
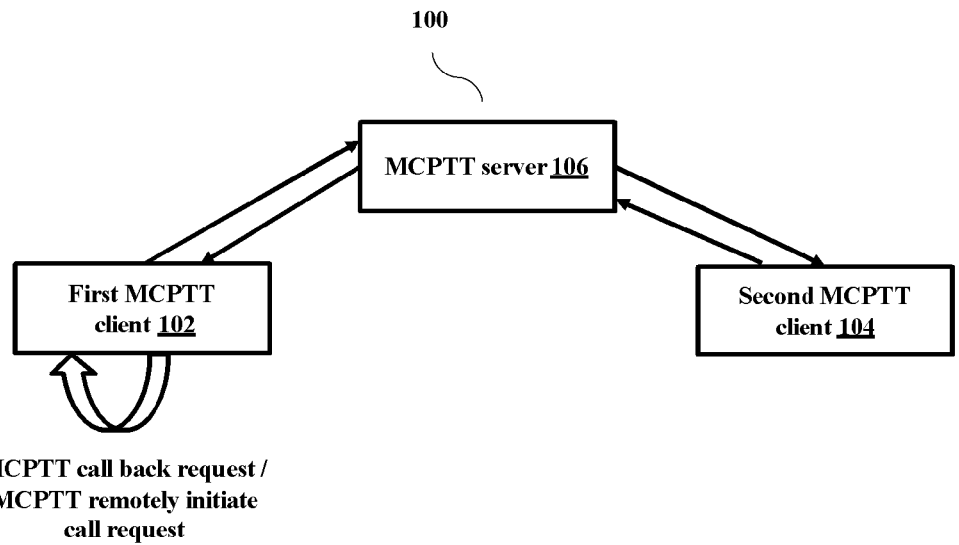
[Fig. 2]
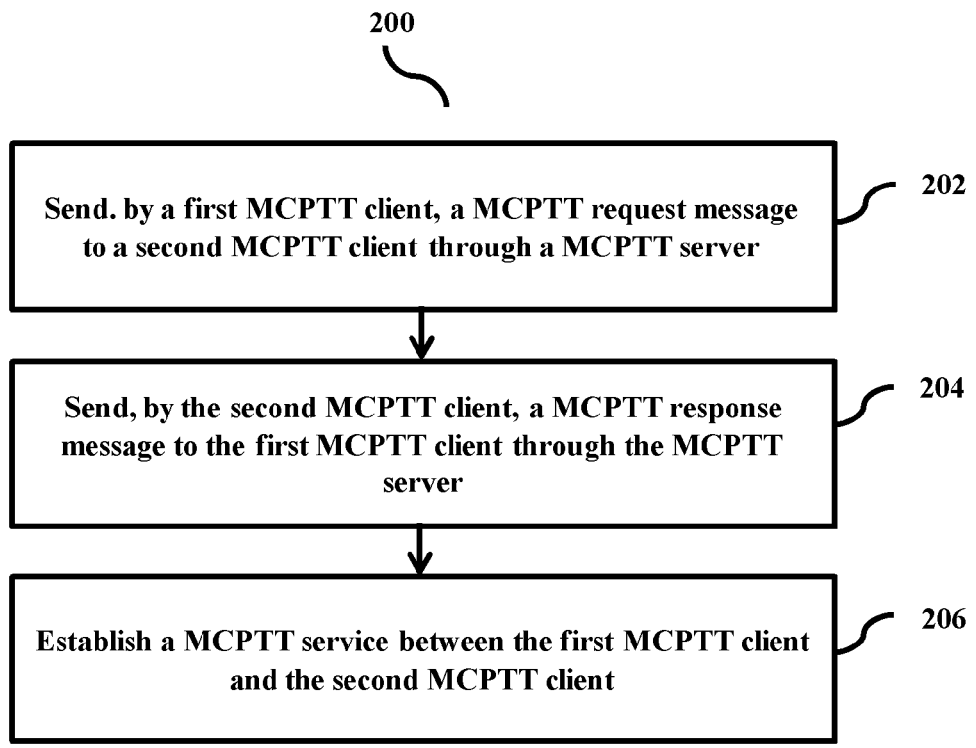

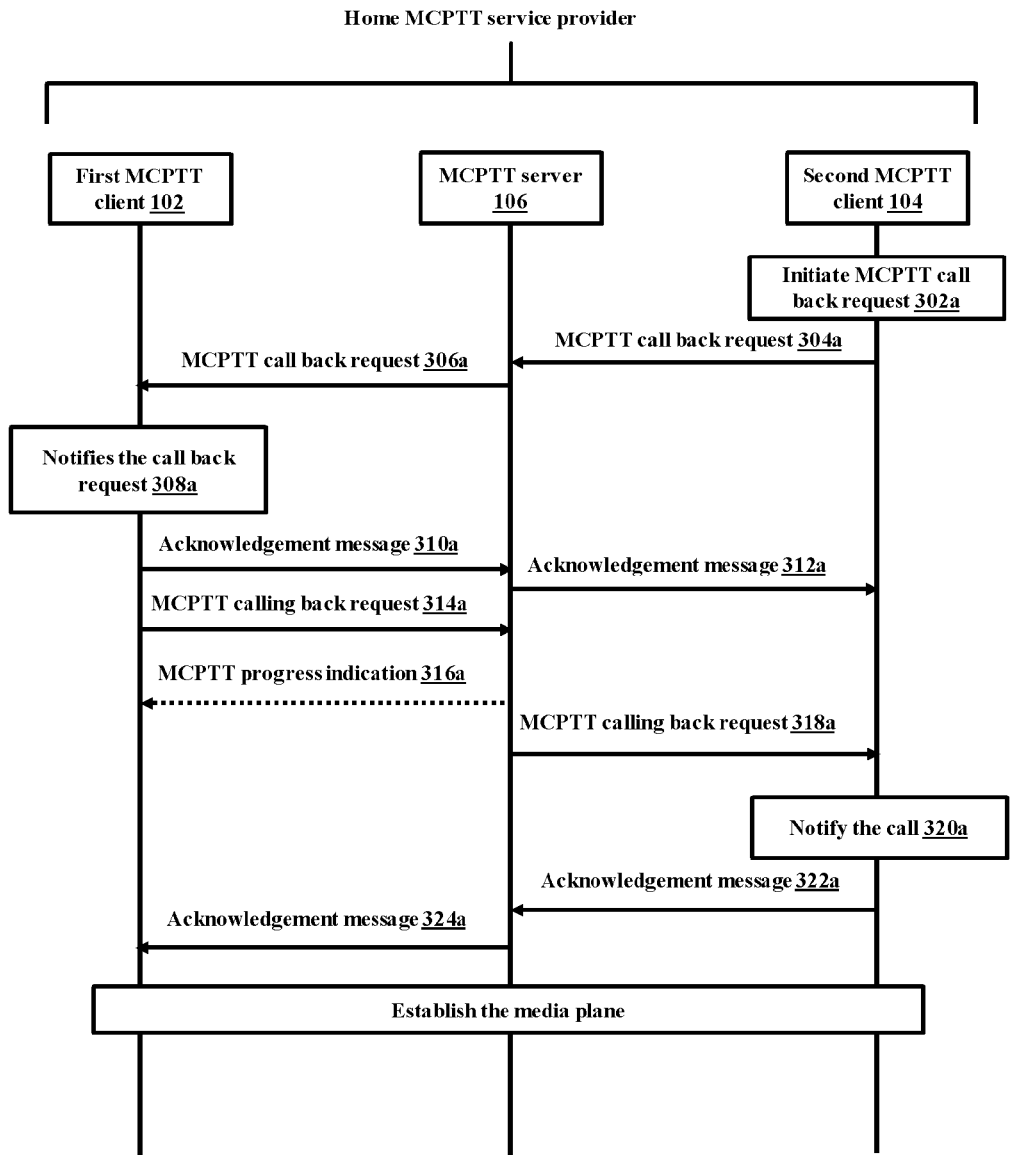
[Fig. 3a]

[Fig. 3b]
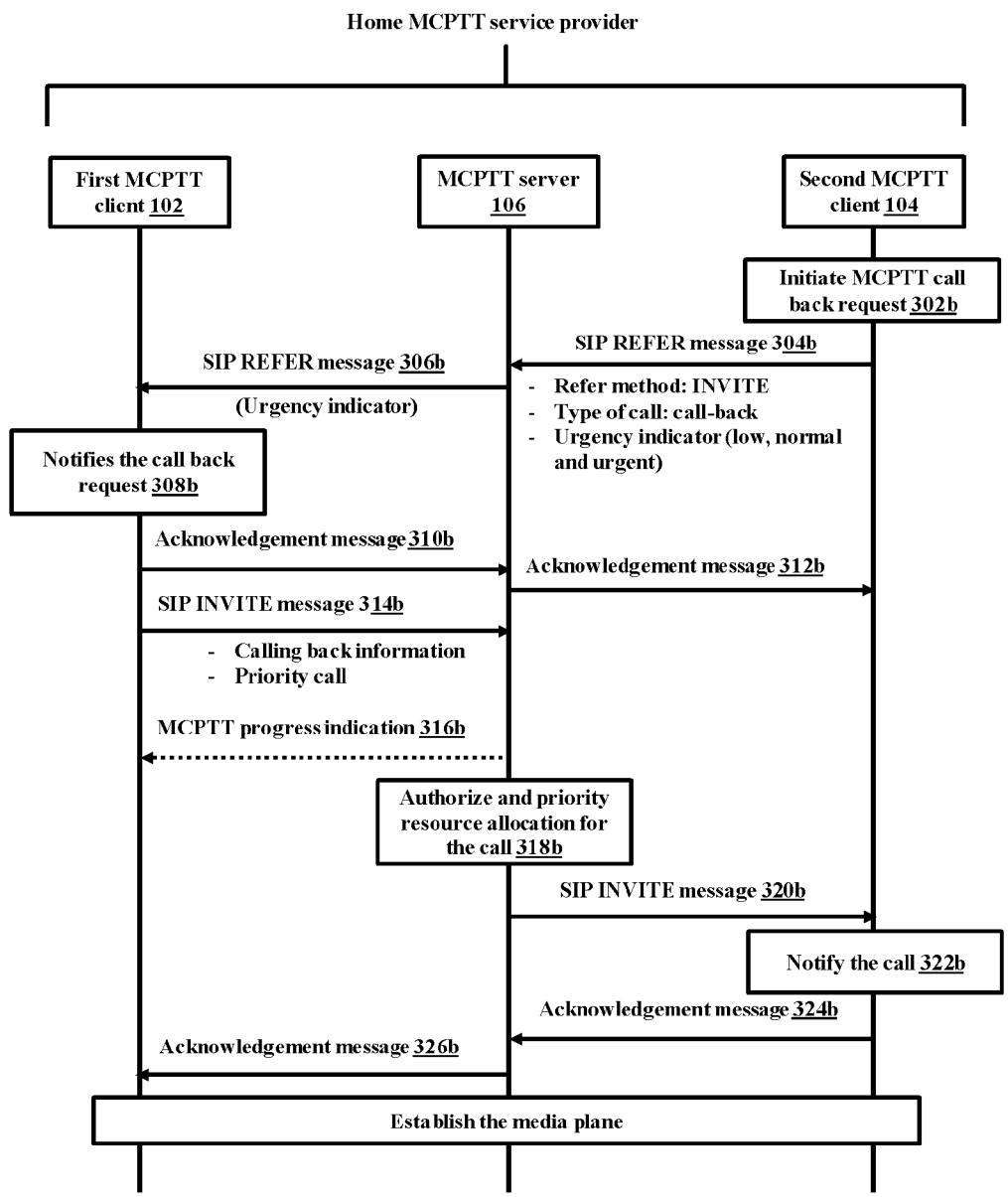

[Fig. 4a]
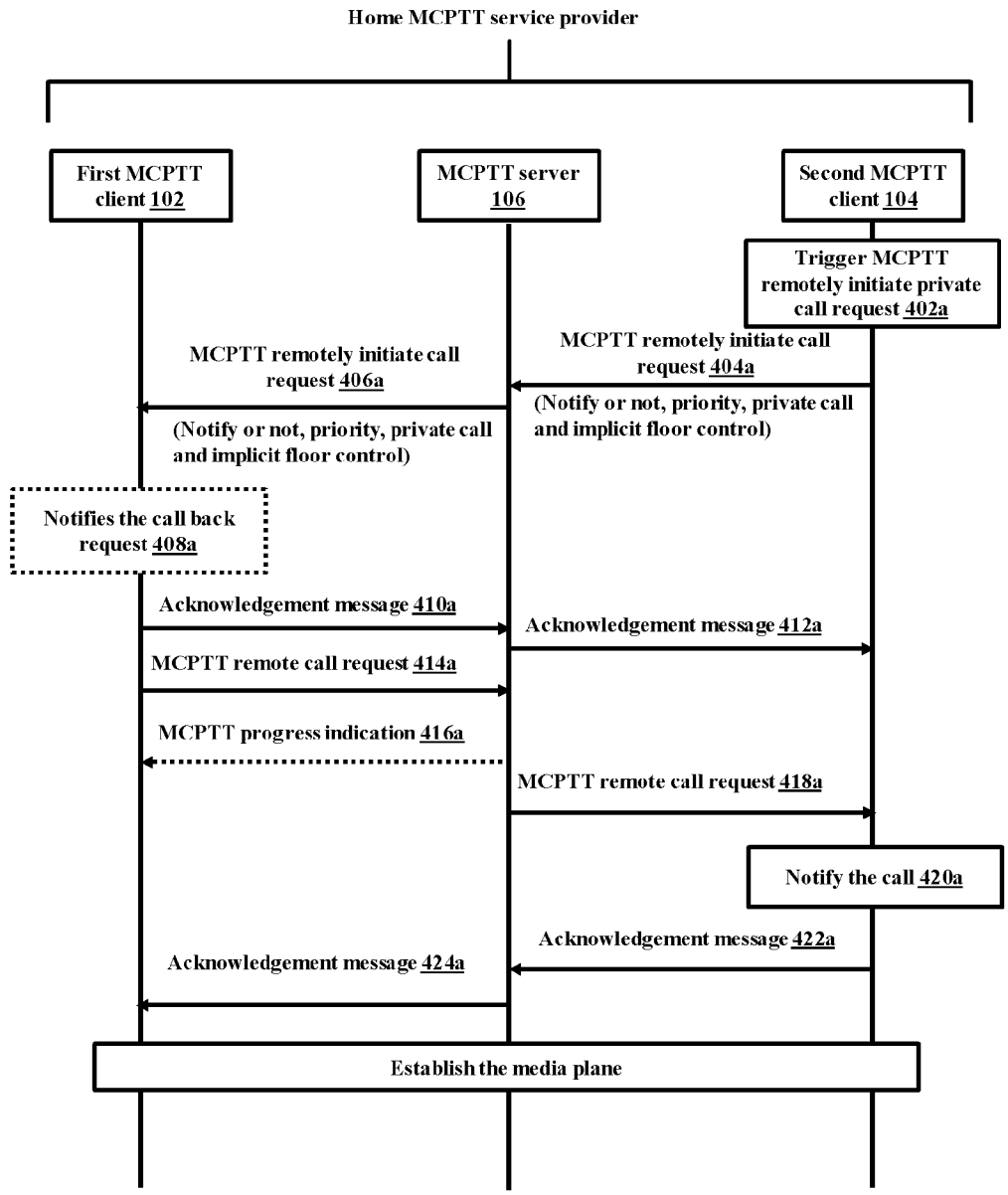

[Fig. 4b]
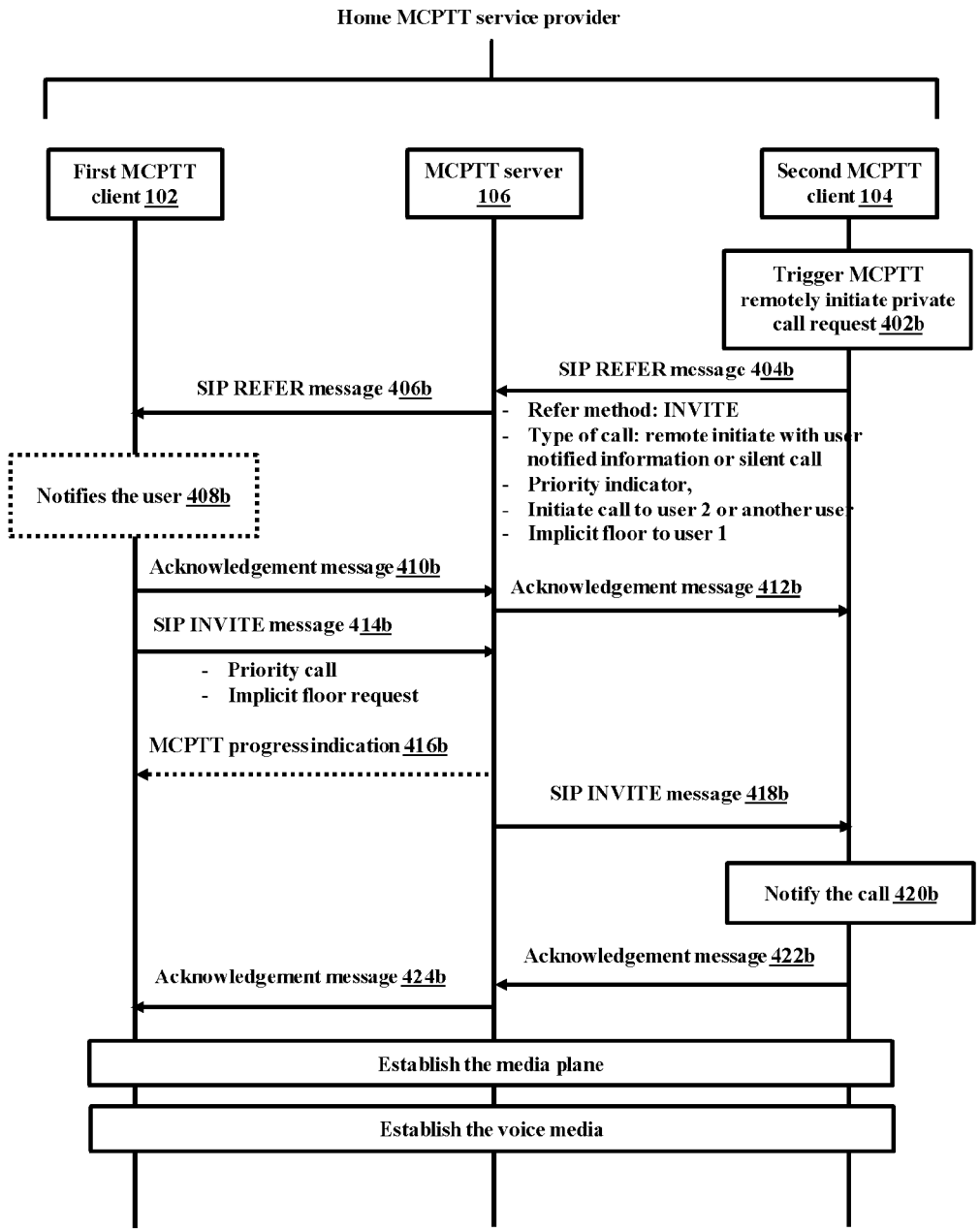

[Fig. 5a]
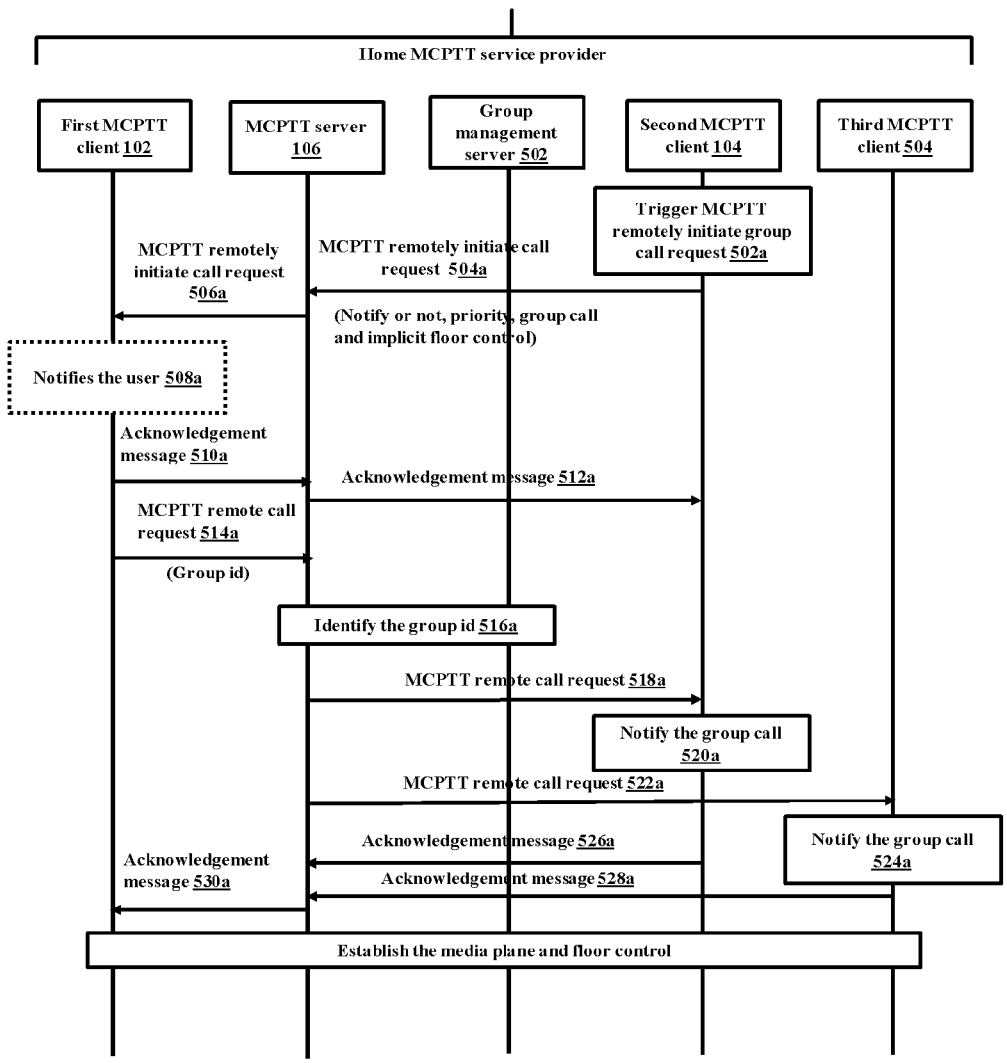

[Fig. 5b]
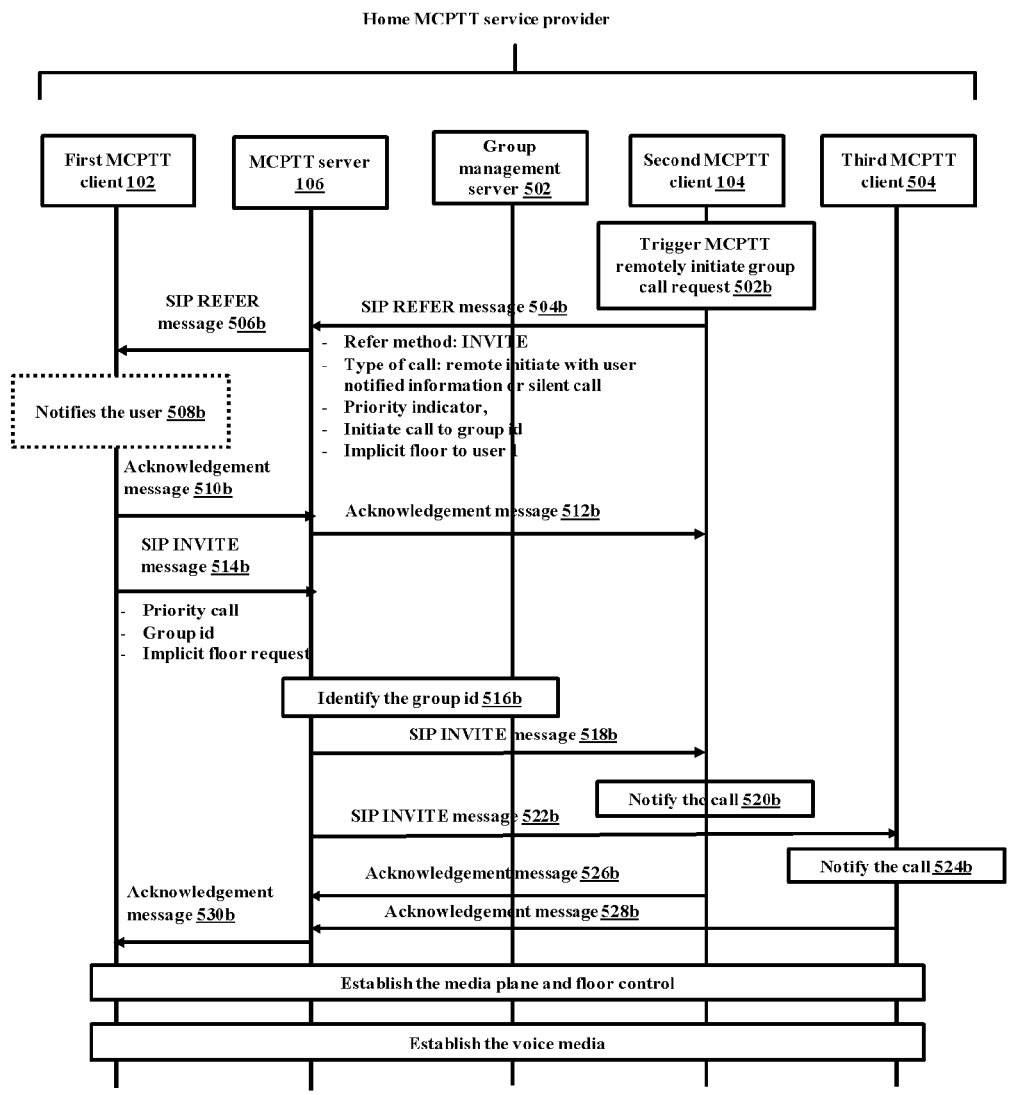
[Fig. 6]
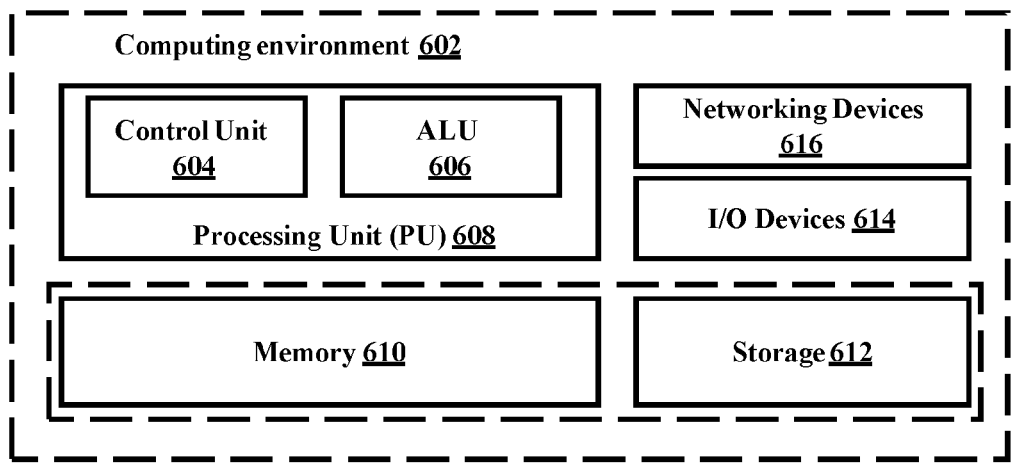

METHOD AND APPARATUS FOR MANAGING MCPTT SERVICE

TECHNICAL FIELD

The present disclosure relates to a communication method and apparatus for managing mcptt service.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

Mission critical communications for public safety is of a significant interest within a public safety community of securing Long Term Evolution (LTE) as the next-generation platform for public safety critical communications over traditional narrowband technologies such as P25 and Terrestrial Trunked Radio (TETRA) systems. The $3^{rd}$ Generation Partnership Project (3GPP) forum is establishing a standard for MCPTT communications over the LTE. The 3GPP has developed a functional model and information flows to enable selectively and sequentially transmit media from one another for some of the scenarios like private call (one-to-one), group call (one-to-many). The public safety community also has requirements for supplementary call scenarios like call back request (i.e., calling party request a called party to place a call back) and remotely initiated call (i.e., authorized user to cause a remote UE to initiate the call by itself with/without the user intervention). However there is no currently defined solution for both these scenarios in the MCPTT and this proposed method provides the solution for these scenarios.

The above information is presented as background information only to help the reader to understand the present invention. Applicants have made no determination and make no assertion as to whether any of the above might be applicable as Prior Art with regard to the present application.

Solution to Problem

The principal object of the embodiments herein is to provide a method for managing a MCPTT service.

Another object of the embodiments herein is to provide a method for managing a MCPTT supplementary call.

Another object of the embodiments herein is to provide a method for supporting a MCPTT call back service.

Another object of the embodiments herein is to provide a method for supporting a MCPTT remote private call.

Another object of the embodiments herein is to provide a method for supporting a MCPTT remote group call.

Another object of the embodiments herein is to provide a method for sending, by a first MCPTT client, a MCPTT request message to a second MCPTT client through a MCPTT server.

Another object of the embodiments herein is to provide a method for sending, by the second MCPTT client, a MCPTT response message to the first MCPTT client through the MCPTT server.

Another object of the embodiments herein is to provide a method for establishing, by the MCPTT server, the MCPTT service between the first MCPTT client and the second MCPTT client.

Embodiments herein disclose a system for managing a MCPTT service. The system includes a first MCPTT client, a second MCPTT client, and a MCPTT server. The first MCPTT client is configured to send a MCPTT request message to the second MCPTT client through the MCPTT server. The second MCPTT client is configured to send a MCPTT response message to the first MCPTT client through the MCPTT server in response to the received MCPTT request message. The MCPTT server is configured to establish a MCPTT call in the MCPTT service between the first MCPTT client and the second MCPTT client.

In an embodiment, the MCPTT request message is a MCPTT call back request message.

In an embodiment, the MCPTT request message is a MCPTT remotely initiate call request message.

In an embodiment, the MCPTT call back request message includes priority indicator. The MCPTT response message includes the priority information.

In an embodiment, the second MCPTT client is notified to call back with the priority information including a time at which the first MCPTT client sent the MCPTT call back request message.

In an embodiment, the second MCPTT client is configured to send the MCPTT call back response message after receiving the input from a user of the second MCPTT client.

In an embodiment, the MCPTT call back response message includes an indication corresponding to a calling back functionality.

In an embodiment, the first MCPTT client notifies the user of the first MCPTT client with the indication corresponding to the calling back functionality in response to the MCPTT call back request message sent to the second MCPTT client through the MCPTT server.

In an embodiment, the MCPTT remotely initiate call request message includes at least one of: a private call, a priority indicator, an implicit floor control, notify indication, not notify indication, and information related to call back to one of: the first MCPTT client and a third MCPTT client.

In an embodiment, the MCPTT response message includes at least one of the priority indicator and an implicit floor request.

In an embodiment, the MCPTT response message is sent autonomously by the second MCPTT client without obtaining the input from the user of the second MCPTT client when the MCPTT remotely initiate call request message includes not notify indication.

In an embodiment, the MCPTT response message is sent after receiving the input from the user of the second MCPTT client, when the MCPTT remotely initiate call request message includes notify indication.

In an embodiment, the first MCPTT client is configured to notify the user of the first MCPTT client with the indication of the MCPTT response message in response to the MCPTT remotely initiate call request message sent to the second MCPTT client through the MCPTT server.

In an embodiment, the MCPTT response message is sent autonomously by the second MCPTT client.

In an embodiment, the MCPTT remotely initiate call request message includes at least one of: the private call, the priority indicator, the implicit floor control, the notify indication, not notify indication, and a group identifier (ID).

In an embodiment, the MCPTT response message includes at least one of the priority indicator, the group ID and the implicit floor request.

In an embodiment, the MCPTT server is configured to identify one or more MCPTT clients in a group associated with the group ID.

In an embodiment, the MCPTT response message is sent autonomously by the second MCPTT client without obtaining the input from the user of the second MCPTT client when the MCPTT remotely initiate call request message includes not notify indication.

In an embodiment, the MCPTT response message is sent after receiving the input from the user of the second MCPTT client when the MCPTT remotely initiate call request message includes notify indication.

In an embodiment, the first MCPTT client is configured to notify the user of the first MCPTT client with the indication of the MCPTT response message in response to the MCPTT remotely initiate call request message sent to the second MCPTT client through the MCPTT server.

In an embodiment, the MCPTT server is configured to notify one or more users of the one or more MCPTT clients with the indication of the MCPTT response message, in response to the MCPTT remotely initiate call request message sent by the second MCPTT client through the MCPTT server.

Embodiments herein disclose a method for managing a MCPTT service. The method includes sending, by a first MCPTT client, a MCPTT request message to a second MCPTT client through a MCPTT server. The MCPTT request message is one of a MCPTT call back request message and a MCPTT remotely initiate call request message. Further, the method includes sending, by the second MCPTT client, a MCPTT response message to the first MCPTT client through the MCPTT server in response to the received MCPTT request message. Furthermore, the method includes establishing, by the MCPTT server, a MCPTT call in the MCPTT service between the first MCPTT client and the second MCPTT client.

Embodiment herein provides a method implemented in a first MCPTT client. The method includes sending, by the first MCPTT client, a MCPTT request message to a second MCPTT client through a MCPTT server. The MCPTT request message is one of a MCPTT call back request message and a MCPTT remotely initiate call request message.

Embodiment herein provides a computer program product including a computer executable program code recorded on a computer readable non-transitory storage medium. The computer executable program code when executed causing the actions including sending, by a first MCPTT client, a MCPTT request message to a second MCPTT client through a MCPTT server. The MCPTT request message is one of a MCPTT call back request message and a MCPTT remotely initiate call request message. The computer executable program code when executed causing the actions including sending, by the second MCPTT client, a MCPTT response message to the first MCPTT client through the MCPTT server in response to the received MCPTT request message. The computer executable program code when executed causing the actions including establishing, by the MCPTT server, a MCPTT call in a MCPTT service between the first MCPTT client and the second MCPTT client.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 1 is an overview of a system for managing a MCPTT service, according to embodiments disclosed herein;

FIG. 2 is a flow diagram illustrating a method for managing the MCPTT service, according to embodiments disclosed herein;

FIG. 3a and FIG. 3b are sequence diagrams illustrating various steps involved during a call back request service in the MCPTT system, according to embodiments disclosed herein;

FIG. 4a and FIG. 4b are sequence diagrams illustrating various steps involved during a remotely initiated private call in the MCPTT system, according to embodiments as disclosed herein;

FIG. 5a and FIG. 5b are sequence diagrams illustrating various steps involved during a remotely initiated group call in the MCPTT system, according to embodiments as disclosed herein; and FIG. 6 illustrates a computing environment implementing a mechanism for managing the MCPTT service, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The term MCPTT client refers to a device with MCPTT capabilities.

The embodiments herein achieve a system for managing a MCPTT service. The system includes a first MCPTT client, a second MCPTT client, and a MCPTT server. The first MCPTT client is configured to send a MCPTT request message to the second MCPTT client through the MCPTT server. The second MCPTT client is configured to send a MCPTT response message to the first MCPTT client through the MCPTT server in response to the received MCPTT request message. The MCPTT server is configured to establish a MCPTT call in the MCPTT service between the first MCPTT client and the second MCPTT client.

In an embodiment, the MCPTT request message is a MCPTT call back request message.

In an embodiment, the MCPTT request message is a MCPTT remotely initiate call request message.

MCPTT Call Back Request Message:

This a mechanism for a calling party MCPTT user to request that a called party MCPTT user place a call to the calling party at an earliest convenience time.

Additional Requirements for Call Back Request:

The MCPTT service shall provide a mechanism for the calling party of an MCPTT private call to assign an urgency indication (i.e., low, normal, urgent) to any call back request.

The MCPTT service shall provide the MCPTT client (i.e., second MCPTT client) receiving an MCPTT private call back request with an indication of the assigned call back urgency assigned by the calling party (i.e., first MCPTT client).

The MCPTT service shall provide a mechanism for an MCPTT user to cancel the call back request.

The MCPTT service shall provide the MCPTT client receiving the MCPTT private call back request with an indication of which MCPTT user called and time of receiving the call back request.

MCPTT Remotely Initiate Call Request Message:

A feature that allows an authorized MCPTT user (typically a dispatcher) to cause a remote MCPTT client to initiate the call by itself, without its user explicitly initiating the call. The purpose of this feature allows the dispatcher to listen to activities at a location of the remote MCPTT client to find out what is happening around that the MCPTT client. There are two typical use cases for this feature. The first one is the case where the user could have been incapacitated. This could be both accidentally, say a traffic accident, or deliberately, for example a violent attack. In both cases it would be necessary to remotely open a microphone of the MCPTT client in order to allow another user or a group of users to listen to what is happening to prepare assistance. The communication is implemented either a private call or a group call, and the call could optionally be visible to the remote MCPTT UE's user.

Further, the second one is the case of a stolen MCPTT client. Here it is just necessary to activate the radio of the MCPTT client so that the dispatcher can listen to any background noise or speech in order to make an analysis of the situation. In this situation, the initiation of the call from the remote MCPTT client, typically a private call in that case, is not visible by that the MCPTT client's user. Other use cases, such as undercover operations, discreet surveillance of users or investigations, could exist depending on the missions of the critical communications users and on legislations. The initiator of the feature can have the capability to request a pre-emptive or high priority for that the call to ensure it is set up even in case of resource congestion or to limit disturbance by other services.

Additional Requirements for MCPTT Remotely Initiate Call Request Message:

The MCPTT service shall provide a mechanism for a MCPTT administrator and/or authorized MCPTT user to cause the MCPTT client that is within their authority to initiate the MCPTT private call (with floor control) to the MCPTT administrator and/or authorized MCPTT user and then begin transmitting to the MCPTT administrator or authorized MCPTT user.

The MCPTT service shall provide a mechanism for the MCPTT administrator and/or authorized user to provide a notification to the user of the MCPTT UE when a remote MCPTT private call is initiated.

The MCPTT service shall provide a mechanism for the MCPTT administrator and/or authorized user to cause the MCPTT client that is within their authority to initiate an MCPTT group call and then to begin transmitting to the affiliated MCPTT group members.

The MCPTT service shall provide a mechanism for the MCPTT administrator and/or authorized user to provide a notification to the user of the MCPTT UE when a remote MCPTT group call is initiated.

Referring now to the drawing, and more particularly to FIGS. 1-6, there are shown preferred embodiments.

FIG. 1 is an overview of a system 100 for managing a MCPTT service, according to embodiments disclosed herein. The system 100 includes a first MCPTT client 102, a second MCPTT client 104, and a MCPTT server 106. The first MCPTT client 102 is configured to send a MCPTT request message to the second MCPTT client 104 through the MCPTT server 106. In an embodiment, the MCPTT request message is a MCPTT call back request message. In an embodiment, the MCPTT request message is a MCPTT remotely initiate call request message.

In response to the received MCPTT request message, the second MCPTT client 104 is configured to send a MCPTT response message to the first MCPTT client 102 through the MCPTT server 106. Based on the MCPTT response message, the MCPTT server 106 is configured to establish the MCPTT service between the first MCPTT client 102 and the second MCPTT client 104.

In an embodiment, the MCPTT call back request message includes a priority indicator.

The MCPTT response message includes the priority information.

In an embodiment, the priority indicator indicates either a low priority indication, a medium priority indication or a high priority indication.

In an embodiment, the second MCPTT client 104 is notified to call back with the priority information including a time at which the first MCPTT client 102 sent the MCPTT call back request message.

In an embodiment, the second MCPTT client 104 is configured to send the MCPTT call back response message after receiving the input from the user of the second MCPTT client 104.

In an embodiment, the MCPTT call back response message includes the indication corresponding to a calling back functionality.

In an embodiment, the first MCPTT client 102 notifies the user of the first MCPTT client 102 with the indication corresponding to the calling back functionality in response to the MCPTT call back request message sent to the second MCPTT client 104 through the MCPTT server 106.

In an embodiment, the MCPTT remotely initiate call request message includes at least one of: a private call, a priority indicator, an implicit floor control, notify indication, not notify indication, and information related to call back to one of: the first MCPTT client 104 and a third MCPTT client (not shown).

In an embodiment, the MCPTT response message is sent autonomously by the second MCPTT client 104 without obtaining the input from the user of the second MCPTT client 104 when the MCPTT remotely initiate call request message includes not notify indication.

In an embodiment, the MCPTT response message is sent after receiving the input from the user of the second MCPTT client 104, when the MCPTT remotely initiate call request message includes notify indication.

In an embodiment, the first MCPTT client 102 is configured to notify the user of the first MCPTT client 102 with the indication of the MCPTT response message in response to the MCPTT remotely initiate call request message sent to the second MCPTT client 104 through the MCPTT server 106.

In an embodiment, the MCPTT response message includes at least one of the priority indicator and an implicit floor request.

In an embodiment, the MCPTT response message is sent autonomously by the second MCPTT client 104.

In an embodiment, the MCPTT remotely initiate call request message includes at least one of: the private call, the priority indicator, the implicit floor control, the notify indication, not notify indication, and a group identifier (ID).

In an embodiment, the MCPTT response message includes at least one of the priority indicator, the group ID and the implicit floor request.

In an embodiment, the MCPTT server 106 is configured to identify one or more MCPTT clients 102 and 104 in a group associated with the group ID.

In an embodiment, the MCPTT response message is sent autonomously by the second MCPTT client 104 without obtaining the input from the user of the second MCPTT client 104 when the MCPTT remotely initiate call request message includes not notify indication.

In an embodiment, the MCPTT response message is sent after receiving the input from the user of the second MCPTT client 104 when the MCPTT remotely initiate call request message includes notify indication.

In an embodiment, the first MCPTT client 102 is configured to notify the user of the first MCPTT client 102 with the indication of the MCPTT response message in response to the MCPTT remotely initiate call request message sent to the second MCPTT client 104 through the MCPTT server 106.

In an embodiment, the MCPTT server 106 is configured to notify one or more users of the one or more MCPTT clients with the indication of the MCPTT response message in response to the MCPTT remotely initiate call request message sent by the second MCPTT client 104 through the MCPTT server 106.

Further, as per the standard, a functional model for a support of the MCPTT system 100 is defined as a series of planes to allow for the breakdown of the architectural description. An application plane provides all of the services (e.g. call control, floor control) required by the user together with the necessary functions to support media control and transfer. It uses the services of the signaling control plane to support those requirements. The application plane also provides for the conferencing of media, trans-coding of media, and provision of tones and announcements. The signaling control plane provides the necessary signaling support to establish the association of users involved in the MCPTT call or other type of call and other services. The signaling control plane also offers access to and control of services applicable to calls. The signaling control plane uses the services of the bearer plane.

The FIG. 1 shows the limited overview of the system 100 but, it is to be understood that other embodiments are not limited thereto. Further, the system 100 can include any number of hardware or software components communicating with each other. For example, the component can be, but not limited to, a process running in the controller or processor, an object, an executable process, a thread of execution, a program, or a computer.

FIG. 2 is a flow diagram 200 illustrating a method for managing the MCPTT service, according to embodiments disclosed herein. At step 202, the method includes sending, by the first MCPTT client 102, the MCPTT request message to the second MCPTT client 104 through the MCPTT server 106. In an embodiment, the MCPTT request message is the MCPTT call back request message. In an embodiment, the MCPTT request message is the MCPTT remotely initiate call request message. At step 204, the method includes sending, by the second MCPTT client 104, the MCPTT response message to the first MCPTT client 102 through the MCPTT server 106. At step 206, the method includes establishing, by the MCPTT server 106, the MCPTT service between the first MCPTT client 102 and the second MCPTT client 104.

Unlike the conventional methods, the proposed method provides the mechanism of the call back request for the calling party MCPTT user (i.e., first MCPTT client 102) to request that a called party MCPTT user (i.e., second MCPTT client 104) place the call to the calling party at the earliest convenience time. The proposed method also provides the remotely initiated call feature that allows the authorized MCPTT user to cause the remote MCPTT client to initiate the call by itself, without any user intervention.

The various actions, acts, blocks, steps, and the like in the method may be performed in the order presented, in a different order or simultaneously. Further, in some embodiments, some actions, acts, blocks, steps, and the like may be omitted, added, modified, skipped, and the like without departing from the scope of the invention.

FIG. 3a and FIG. 3b are sequence diagrams illustrating various steps involved during a call back request service in the MCPTT system 100, according to embodiments disclosed herein. The basic signaling control plane procedures for the second MCPTT client 104 initiating the call back request to the user of the first MCPTT client 102 is explained in the FIG. 3a.

Step-302a: The user of the second MCPTT client 104 would like to initiate the MCPTT call back request message and select the urgency indication.

Step-304a: The second MCPTT client 104 sends the MCPTT call back request message towards the MCPTT server 106 via a SIP core (not shown) for requesting the call back from the first MCPTT client 102. The MCPTT call back request message includes the urgency indicator.

The urgency indicator indicates the urgency level corresponding to low, normal (medium), or urgent (high).

Step-306a: The MCPTT server 306a authorizes the MCPTT call back request message from the second MCPTT client 104 and sends the MCPTT call back request message towards the first MCPTT client 102 via the SIP core.

Step-308a: The user at the first MCPTT client 102 is notified that the user at the second MCPTT client 104 is requesting the call back which includes the urgency and time of the request triggered. In an embodiment, the user at the second MCPTT client 104 can request cancel of the MCPTT call back request message any time after the step 304a and before the step 314a.

Step-310a: The first MCPTT client 102 sends an acknowledgment message to the MCPTT server 104.

Step-312a: The MCPTT server 104 sends the acknowledgment message to the second MCPTT client 104 via the SIP core.

Step-314a: Based on confirmation from the user at the first MCPTT client 102 to initiate the call back, the first MCPTT client 102 sends the MCPTT calling back request towards the MCPTT server 106 via the SIP core.

Step-316a: The MCPTT server 106 may provide a progress indication to the first MCPTT client 102 to indicate progress in the call setup process. The step 316a may occur at any time following the step 314a and prior to the step 324a.

Step-318a: Upon checking the authorization, the MCPTT server 106 sends the corresponding MCPTT calling back request towards the second MCPTT client 104.

Step-320a: The second MCPTT client 104 notifies the user about the incoming call back information.

In an embodiment, the second MCPTT client 104 notifies a user of the second MCPTT client 104 with the indication corresponding to the calling back functionality in response to the MCPTT call back request message sent to the first MCPTT client 102 through the MCPTT server 106.

Step-322a: The second MCPTT client 104 accepts the MCPTT calling back request and sends the acknowledgement message to the MCPTT server 106 via the SIP core.

Step-324a: Upon receiving the acknowledgement from the second MCPTT client 104, the MCPTT server 106 sends the acknowledgement message to the first MCPTT client 102. Further, the MCPTT server 106 informs the first MCPTT client 102 about successful call establishment.

Further, the first MCPTT client 102 and the second MCPTT client 104 have successfully established the media plane for communication and either user can the transmit media (e.g., voice, message or the like). In case of successful call establishment with the floor control request from the first MCPTT client 102, a floor participant at the first MCPTT client 102 is granted floor by a floor control server, giving it permission to transmit. At the same time floor participant at the second MCPTT client 104 is informed by the floor control server that floor is taken.

The call back request service is explained in detailed as shown in the FIG. 3b.

Step-302b: The user of the second MCPTT client 104 would like to initiate the MCPTT call back request message and select the urgency indication.

Step-304b: The second MCPTT client 104 sends the SIP REFER message towards the MCPTT server 106 via the SIP core for requesting the call back from the first MCPTT client 102. The SIP REFER message comprises at least one of "refer method: invite", "type of call: call-back" and the urgency indicator. The urgency indicator indicates the urgency level corresponding to low, normal, or urgent.

Step-306b: The MCPTT server 106 authorizes the SIP REFER message from the second MCPTT client 104 and sends the SIP REFER message towards the first MCPTT client 102 via the SIP core.

The SIP REFER message can be constructed as below:
REFER sips:admin@mcptt.example.com SIP/2.0
From: <sips:Bob@mcpttexample.com>;tag=1234567
To: Admin <sips:admin@mcpttexample.com>
Call-ID: 1234560183434
Cseq: 1 REFER
Refer-To: <sips:Bob@mcptt.example.com>
Refer-Sub: false
Contact: <sips:Bob@mcpttexample.com>
Content-Type: application/call-back+xml
Content-Length: xyz
Content-ID: <cn35t8jf02@example.com>
<?xml version="1.0" encoding="UTF-8"?>
<call-back xmlns="urn:ietf:params:xml:ns:call-back"
xmlns:xsi="http://www.w3.org/2001/XMLSchema-instance">
  <call-type> call-back </call-type>
  <urgency-indicator> low/normal/urgent </urgency-indicator>
</call-back>

Step-308b: The user at the first MCPTT client 102 is notified that the user at the second MCPTT client 104 is requesting the call back which includes the urgency and time of the SIP REFER message is triggered. In an embodiment, the user at the second MCPTT client 104 can request cancel of the MCPTT call back request message any time after the step 304b and before the step 314b.

Step-310b: The first MCPTT client 102 sends the acknowledgment message to the MCPTT server 104.

Step-312b: The MCPTT server 104 sends the acknowledgment message to the second MCPTT client 104 via the SIP core.

In another embodiment, the call back feature is implemented with a SIP MESSAGE instead of the SIP REFER message.

In an embodiment, the SIP MESSAGE may include the information about the call-type and the urgency-indicator.

In an embodiment, the call-type and the urgency-indicator is carried in a SIP header.

Step-314b: Based on confirmation from the user at the first MCPTT client 102 to initiate the call back request, the first MCPTT client 102 sends a SIP INVITE message towards the MCPTT server 106 via the SIP core.

In an embodiment, the SIP INVITE message includes at least one of the calling back information and the priority call.

Step-316b: The MCPTT server 106 may provide a progress indication to the first MCPTT client 102 to indicate progress in the call setup process. The step 316b may occur at any time following the step 314b and prior to the step 326b.

Step-318b: The MCPTT server 106 is configured to authorize the resource allocation for the call and prioritize the resource allocation for the call.

Step-320b: Upon checking the authorization, the MCPTT server 106 sends the corresponding SIP INVITE message towards the second MCPTT client 104.

In an embodiment, the second MCPTT client 104 notifies the user of the second MCPTT client 104 with the indication corresponding to the calling back functionality in response to the MCPTT call back request message sent to the first MCPTT client 102 through the MCPTT server 106.

Step-322b: The second MCPTT client 104 notifies the user about the incoming call back information.

Step-324b: The second MCPTT client 104 accepts the MCPTT calling back request and sends the acknowledgement message to the MCPTT server 106 via the SIP core.

Step-326b: Upon receiving the acknowledgement from the second MCPTT client 104, the MCPTT server 106 sends the acknowledgement message to the first MCPTT client 102. Further, the MCPTT server 106 informs the first MCPTT client 102 about successful call establishment.

Further, the first MCPTT client 102 and the second MCPTT client 104 have successfully established the media plane for communication and either user can the transmit media (e.g., voice, message or the like). In case of successful call establishment with the floor control request from the first MCPTT client 102, a floor participant at the first MCPTT client 102 is granted floor by a floor control server, giving it permission to transmit. At the same time floor participant at the second MCPTT client 104 is informed by the floor control server that floor is taken.

FIG. 4a and FIG. 4b are sequence diagrams illustrating various steps involved during the remotely initiated private call in the MCPTT system 100, according to embodiments as disclosed herein. As shown in the FIG. 4a, the procedure focuses on the case where the authorized MCPTT user (i.e., second MCPTT client 104) is requesting the MCPTT remotely initiate private call request. The procedures in the FIG. 4a are the basic signaling control plane procedures for the second MCPTT client 104 triggering request for remotely initiating the MCPTT private call with the first MCPTT client 102.

Step-402a: The user of the second MCPTT client 104 would like to remotely initiate the MCPTT private call to a selected MCPTT user (i.e., first MCPTT client 102) with or without notifying user and select the priority for the call.

Step-404a: The second MCPTT client 104 sends the MCPTT remotely initiate call request message towards the MCPTT server 106 via the SIP core for requesting the remote private call from the first MCPTT client 102. The MCPTT remotely initiate call request message includes the instruction to the first MCPTT client 102 on whether its user is to be notified or not, parameters that need to be included in the remote private call request like priority, and implicit floor control.

Step-406a: The MCPTT server 106 authorizes the request message from the second MCPTT client 104 and sends the request message towards first MCPTT client 102 via the SIP core.

Step-408a: If instructed in the received request to notify user, the user at the first MCPTT client 102 is notified that the user at the second MCPTT client 104 is requesting the remote call initiation.

In an embodiment, if instructed in the received request to not notify user, the user at the first MCPTT client 102 is not notified that the user at the second MCPTT client 104 is requesting the remote call initiation.

In an embodiment, the MCPTT response message is sent autonomously by the first MCPTT client 102 without obtaining the input from the user of the first MCPTT client 102 when the MCPTT remotely initiate call request message includes not notify indication.

Step-410a: The first MCPTT client 102 sends the acknowledgment message to the MCPTT server 106.

Step-412a: The MCPTT server 106 sends the acknowledgment message to the second MCPTT client 104 through the SIP core.

Step-414a: The first MCPTT client 102 sends an MCPTT remote call request towards the MCPTT server 106 via the SIP core for establishing the private call with the second MCPTT client 104. The MCPTT remote call request also contains the priority information and implicit floor control information.

In an embodiment, the MCPTT remote call request is sent autonomously by the first MCPTT client 102 without obtaining the input from the user of the first MCPTT client 102 when the MCPTT remotely initiate call request message includes not notify indication.

Step-416a: The MCPTT server 106 may provide the progress indication to the first MCPTT client 102 to indicate progress in the call setup process, if the user at the first MCPTT client 102 is already notified about the remote call initiation. In an embodiment, the step 416a may occur at any time following step 414a and prior to step 424a.

Step-418a: Upon checking the authorization, the MCPTT server 106 sends the corresponding MCPTT remote call request towards the second MCPTT client 104 that made the initial MCPTT remotely initiate call request message at the second MCPTT client 104. In case of resource congestion, the MCPTT server 106 may pre-empt another call (e.g., based on the priority received) to ensure this call is set up.

Step-420a: The second MCPTT client 104 notifies the user about the incoming remote call.

In an embodiment, the second MCPTT client 104 notifies the user of the second MCPTT client 104 with the indication corresponding to the calling back functionality in response to the MCPTT call back request message sent to the first MCPTT client 102 through the MCPTT server 106.

Step-422a: The second MCPTT client 104 accepts the MCPTT remote call request and sends the message acknowledgement to the MCPTT server 106 via the SIP core.

Step-424a: Upon receiving the acknowledgement message from the second MCPTT client 104 accepting the MCPTT remote call request, the MCPTT server informs the first MCPTT client 102 about successful call establishment.

Further, the first MCPTT client 102 and the second MCPTT client 104 have successfully established the media plane for communication with the floor granted to the first MCPTT client 102 to allow the media transmission to begin immediately.

The remotely initiated private call is explained detailed in the FIG. 4b.

Step-402b: The user of the second MCPTT client 104 would like to remotely initiate the MCPTT private call to the selected MCPTT user (i.e., first MCPTT client 102) with or without notifying user and select the priority for the call.

Step-404b: The second MCPTT client 104 sends the SIP REFER message towards the MCPTT server 106 via the SIP core for requesting the remote private call from the first MCPTT client 102.

In an embodiment, the MCPTT remotely initiate call request message includes the instruction to the first MCPTT client 102 on whether its user is to be notified or not, parameters that need to be included in the remote private call request like priority, implicit floor control.

Step-406b: The MCPTT server 106 authorizes the SIP REFER message from the second MCPTT client 104 and sends SIP REFER message towards the first MCPTT client 102 via the SIP core.

In an embodiment, the SIP REFER message includes at least one of "refer method: invite", "type of call: remote initiate with user notified information", "type of call: remote initiate with a silent call", priority indicator, initiate call along with user identification, and implicit floor mapped with the user identification.

In an embodiment, the SIP REFER message can be constructed as below:
REFER sips:bob@mcptt.example.com SIP/2.0
From: <sips:admin@mcpttexample.com>;tag=1234567
To: Bob<sips:bob@mcptt.example.com>
Call-ID: 1234560183434
CSeq: 1 REFER
Refer-To: <sips:admin@mcpttexample.com>
Refer-Sub: false
Contact: <sips:admin@mcpttexample.com>
Content-Type: application/remote-call+xml
Content-Length: xyz
Content-ID: <cn35t8jf02@example.com>
<?xml version, "1.0" encoding="UTF-8"?>
<remote-call xmlns="urn:ietf:params:xml:ns:remote-call"xmlns:xsi="http://www.w3.org/2001/XM LSchema-in-stance">
<call-type> remote-call </call-type>
<call-to>sips:admin@mcpttexample.com</call-to>
<user-notified> yes/no</user-notified>
<priority-indicator> x</priority-indicator>
<implicit-floor> yes/no</implicit-floor>
</call-back-request>

Step-408b: If instructed in the received request to notify the user, the user at the first MCPTT client 102 is notified that the user at the second MCPTT client 104 is requesting the remote call initiation.

In an embodiment, if instructed in the received request to not notify user, the user at the first MCPTT client 102 is not notified that the user at the second MCPTT client 104 is requesting the remote call initiation.

In an embodiment, the MCPTT response message is sent autonomously by the first MCPTT client 102 without obtaining the input from the user of the first MCPTT client 102 when the MCPTT remotely initiate call request message includes not notify indication.

Step-410b: The first MCPTT client 102 sends the acknowledgment message to the MCPTT server 106.

Step-412b: The MCPTT server 106 sends the acknowledgment message to the second MCPTT client 104 through the SIP core.

In another embodiment, the remotely initiate call feature is implemented with the SIP MESSAGE instead of the SIP REFER message.

Step-414b: The first MCPTT client 102 sends the SIP INVITE message towards the MCPTT server 106 via the SIP core for establishing the private call with the second MCPTT client 104. In an embodiment, the SIP INVITE message includes the priority information and the implicit floor request.

In an embodiment, the SIP INVITE message may include the information that is contained in the SIP REFER message.

In an embodiment, the remote-call information may be carried in the SIP header.

In an embodiment, the remote call feature can be implemented with the SIP MESSAGE instead of the SIP REFER message.

Step-416b: The MCPTT server 106 may provide the progress indication to the first MCPTT client 102 to indicate progress in the call setup process, if the user at the first MCPTT client 102 is already notified about the remote call initiation. In an embodiment, the step 416b may occur at any time following step 414b and prior to step 424b.

Step-418a: Upon checking the authorization, the MCPTT server 106 sends the corresponding SIP INVITE message towards the second MCPTT client 104 that made the initial MCPTT remotely initiate call request message at the second MCPTT client 104. In case of resource congestion, the MCPTT server 106 may pre-empt another call (e.g., based on the priority received) to ensure this call is set up.

Step-420b: The second MCPTT client 104 notifies the user about the incoming remote call.

In an embodiment, the second MCPTT client 104 notifies the user of the second MCPTT client 104 with the indication corresponding to the calling back functionality in response to the MCPTT call back request message sent to the first MCPTT client 102 through the MCPTT server 106.

Step-422b: The second MCPTT client 104 accepts the MCPTT remote call request and sends the message acknowledgement message to the MCPTT server 106 via the SIP core.

Step-424b: Upon receiving the acknowledgement message from the second MCPTT client 104 accepting the MCPTT remote call request, the MCPTT server 106 informs the first MCPTT client 102 about successful call establishment.

Further, the first MCPTT client 102 and the second MCPTT client 104 have successfully established media plane for communication with the floor granted to the first MCPTT client 102 to allow media transmission to begin immediately.

FIG. 5a and FIG. 5b are sequence diagrams illustrating various steps involved during the remotely initiated group call in the MCPTT system 100, according to embodiments as disclosed herein. The procedure focuses on the case where the authorized MCPTT user (i.e., second MCPTT client 104) is requesting MCPTT remotely initiate the group call request. The procedures in the FIG. 5a and FIG. 5b are the signaling control plane procedures for the MCPTT client triggering request for remotely initiating the MCPTT group call for a pre-arranged group.

Pre-Conditions for the MCPTT Group Call:

The pre-arranged group is the MCPTT group that is pre-defined with the group ID and member list in a group management server 502. All members of the group belong to the same MCPTT system.

It is assumed that MCPTT users on the first MCPTT client 102, the second MCPTT client 104 and the third MCPTT client 504 are already registered for receiving the MCPTT service and affiliated.

The sequence of steps are described below:

Step-502*a*: The user at the second MCPTT client 104 would like to remotely initiate the MCPTT group call to the selected MCPTT group identity with or without notifying user and select the priority for the call.

Step-504*a*: The second MCPTT client 104 sends the MCPTT remotely initiate call request message towards the MCPTT server 106 via the SIP core for requesting the remote group call from the first MCPTT client 102. In an embodiment, the MCPTT remotely initiate call request message includes the instruction to the first MCPTT client 102 on whether its user is to be notified or not, the MCPTT group identity, the parameters that need to be included in the remote group call request like priority, and the implicit floor control.

Step-506*a*: The MCPTT server 106 authorizes the request from the second MCPTT client 104 and sends the request towards the first MCPTT client 102 via the SIP core.

Step-508*a*: If instructed in the received request to notify the user, the user at the first MCPTT client 102 is notified that the user at the second MCPTT client 104 is requesting the remote call initiation.

In an embodiment, the MCPTT response message is sent autonomously by the first MCPTT client 102 without obtaining the input from the user of the first MCPTT client 102 when the MCPTT remotely initiate call request message includes not notify indication.

Step-510*a*: The first MCPTT client 102 sends the acknowledgement message to the MCPTT server 106.

Step-512*a*: The MCPTT server 106 sends the acknowledgement message to the first MCPTT client 102 via the SIP core.

Step-514*a*: The first MCPTT client 102 sends the MCPTT remote call request towards the MCPTT server 106 via the SIP core. The acknowledgement message to hosts the group identified by the MCPTT group identity. In an embodiment, the MCPTT remote call request includes the priority information, the group ID and the implicit floor control.

Step-516*a*: Upon checking the authorization, the MCPTT server 106 resolves the group identity to determine the members of that group based on the information from the group management server 502.

Step-518*a*: The MCPTT server 106 sends the corresponding MCPTT remote call request via the SIP core towards the second MCPTT client 104. In case of the resource congestion, the MCPTT server 106 may pre-empt another call (e.g., based on the priority received) to ensure this call is set up even in such scenarios. The MCPTT users are notified about the incoming remote group call.

Step-520*a*: The second MCPTT client 104 accepts the MCPTT remote group call request and the second MCPTT client 104 notifies the user about the incoming remote group call.

In an embodiment, the second MCPTT client 104 notifies the user of the second MCPTT client 104 with the indication corresponding to the incoming remote group call in response to the MCPTT group call request message sent to the first MCPTT client 102 through the MCPTT server 106.

Step-522*a*: The MCPTT server 106 sends the corresponding MCPTT remote call request via the SIP core towards the third MCPTT client 504.

Step-524*a*: The third MCPTT client 504 accepts the MCPTT remote group call request and the third MCPTT client 504 notifies the user about the incoming remote group call.

In an embodiment, the third MCPTT client 504 notifies the user of the third MCPTT client 504 with the indication corresponding to the incoming remote group call in response to the MCPTT group call request message sent to the first MCPTT client 102 through the MCPTT server 106.

Step-526*a*: The second MCPTT client 104 sends the acknowledgement message to the MCPTT server 106.

Step-528*a*: The third MCPTT client 504 sends the acknowledgement message to the MCPTT server 106.

Step-530*a*: The MCPTT server 106 sends the acknowledgement message to the first MCPTT client 104 through the signaling path to inform about successful call establishment.

Further, the first MCPTT client 102, the second MCPTT client 104 and the third MCPTT client 504 have successfully established the media plane for communication. The floor is implicitly granted to the first MCPTT client 102 to begin media transmission immediately, while the second MCPTT client 104 and the third MCPTT client 504 in the remote group call will be receiving that media.

In an embodiment, if one of the MCPTT clients is not in an on-network i.e., assuming the third MCPTT client 504 is in off-network then one of the MCPTT clients within the off-network reach for the third MCPTT client 504 will act as the UE to network relay and include the third MCPTT client 504 also as part of the group call. In such case the voice media transmission from the first MCPTT client 102 is relayed to the third MCPTT client 504 in the off-network via the MCPTT client acting as the UE to the network relay.

The remotely initiated group call is explained detailed in the FIG. 5*b*.

Step-502*b*: The user at the second MCPTT client 104 would like to remotely initiate the MCPTT group call to the selected MCPTT group identity with or without notifying user and select the priority for the call.

Step-504*b*: The second MCPTT client 104 sends the SIP REFER message towards the MCPTT server 106 via the SIP core for requesting the remote group call from the first MCPTT client 102. In an embodiment, the SIP REFER message includes at least one of the "refer method: invite", "type of call: remote initiate with user notified information", "type of call: remote initiate with silent call", the priority indicator, the initiate call along with the group ID, and the implicit floor mapped with the user ID.

Step-506*b*: The MCPTT server 106 authorizes the SIP REFER message from the second MCPTT client 104 and sends the SIP REFER message towards the first MCPTT client 102 via the SIP core.

The SIP REFER message can be constructed as below:
REFER sips:bob@mcptt.example.com SIP/2.0
From: <sips:admin@mcpttexample.com>;tag=1234567
To: Bob <sips:bob@mcpttexample.com>
Call-ID: 1234560183434
CSeq: 1 REFER
Refer-To: <sips:group1@mcpttexample.com>
Refer-Sub: false
Contact: <sips:admin@mcpttexample.com>
Content-Type: application/remote-call+xml
Content-Length: xyz
Content-ID: <cn35t8jf02@example.com>
<?xml version="1.0" encoding="UTF-8"?>

```
<remote-call    xmlns="urn:ietf:params:xml:ns:remote-
call"
    xmlns:xsi="http://www.w3.org/2001/XMLSchema-in-
stance">
    <call-type> remote-call </call-type>
    <call-to> sips:group1@mcptt.example.com </call-to>
    <user-notified> yes/no</user-notified>
    <priority-indicator> x</priority-indicator>
    <implicit-floor> yes/no</implicit-floor>
    </call-back-request>
```

Step-508*b*: If instructed in the received request to notify the user, the user at the first MCPTT client 102 is notified that the user at the second MCPTT client 104 is requesting the remote call initiation.

In an embodiment, the MCPTT response message is sent autonomously by the first MCPTT client 102 without obtaining the input from the user of the first MCPTT client 102 when the MCPTT remotely initiate call request message includes not notify indication.

Step-510*b*: The first MCPTT client 102 sends the acknowledgement message to the MCPTT server 106.

Step-512*b*: The MCPTT server 106 sends the acknowledgement message to the first MCPTT client 102 via the SIP core.

Step-514*b*: The first MCPTT client 102 sends the SIP INVITE message towards the MCPTT server 106 via the SIP core.

In an embodiment, the SIP INVITE message includes the priority call information, the group ID and the implicit floor control.

In an embodiment, the SIP INVITE message may include the information that is contained in the received SIP REFER message.

In another embodiment, the remote-call information may be carried in the SIP headers.

In another embodiment, the remote call feature can be implemented with the SIP MESSAGE instead of the SIP REFER message.

Step-516*b*: Upon checking the authorization, the MCPTT server 106 resolves the group identity to determine the members of that group based on the information from the group management server 502.

Step-518*b*: The MCPTT server 106 sends the corresponding MCPTT remote call request via the SIP core towards the second MCPTT client 104. In case of the resource congestion, the MCPTT server 106 may pre-empt another call (e.g., based on the priority received) to ensure this call is set up. The MCPTT users are notified about the incoming remote group call.

Step-520*b*: The second MCPTT client 104 accepts the SIP INVITE message and the second MCPTT client 104 notifies the user about the incoming remote group call.

In an embodiment, the second MCPTT client 104 notifies the user of the second MCPTT client 104 with the indication corresponding to the incoming remote group call in response to the MCPTT group call request message sent to the first MCPTT client 102 through the MCPTT server 106.

Step-522*b*: The MCPTT server 106 sends the corresponding SIP INVITE message via the SIP core towards the third MCPTT client 504.

Step-524*b*: The third MCPTT client 504 accepts the SIP INVITE message and the third MCPTT client 504 notifies the user about the incoming remote group call.

In an embodiment, the third MCPTT client 504 notifies the user of the third MCPTT client 504 with the indication corresponding to the incoming remote group call in response to the MCPTT group call request message sent to the first MCPTT client 102 through the MCPTT server 106.

Step-526*b*: The second MCPTT client 104 sends the acknowledgement message to the MCPTT server 106.

Step-528*b*: The third MCPTT client 504 sends the acknowledgement message to the MCPTT server 106.

Step-530*b*: The MCPTT server 106 sends the acknowledgement message to the first MCPTT client 104 through the signaling path to inform about successful call establishment.

Further, the first MCPTT client 102, the second MCPTT client 104 and the third MCPTT client 504 have successfully established the media plane for communication. The floor is implicitly granted to the first MCPTT client 102 to begin media transmission immediately, while the second MCPTT client 104 and the third MCPTT client 504 in the remote group call will be receiving that media.

FIG. 6 illustrates the computing environment 602 implementing a mechanism for managing the MCPTT service, according to embodiments as disclosed herein. The computing environment 602 comprises at least one processing unit 608 that is equipped with a control unit 604, an Arithmetic Logic Unit (ALU) 606, a memory 610, a storage unit 612, a plurality of networking devices 616 and a plurality Input/Output (I/O) devices 614. The processing unit 608 is responsible for processing the instructions of the technique. The processing unit 608 receives commands from the control unit 604 in order to perform its processing. Further, any logical and arithmetic operations involved in the execution of the instructions are computed with the help of the ALU 606.

The overall computing environment 602 can be composed of multiple homogeneous or heterogeneous cores, multiple CPUs of different kinds, special media and other accelerators. The processing unit 608 is responsible for processing the instructions of the technique. Further, the plurality of processing units 604 may be located on a single chip or over multiple chips.

The technique comprising of instructions and codes required for the implementation are stored in either the memory unit 610 or the storage 612 or both. At the time of execution, the instructions may be fetched from the corresponding memory 610 or storage 612, and executed by the processing unit 608.

In case of any hardware implementations various networking devices 616 or external I/O devices 614 may be connected to the computing environment 602 to support the implementation through the networking unit and the I/O device unit.

The embodiments disclosed herein can be implemented through at least one software program running on at least one hardware device and performing network management functions to control the elements. The elements shown in the FIGS. 1 through 6 include blocks which can be at least one of a hardware device, or a combination of hardware device and software module.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A first MCPTT client for managing a Mission Critical Push-to-Talk (MCPTT) service, the first MCPTT client comprising:
a networking device; and
a processing unit configured to control the networking device to:
transmit an MCPTT request message to a second MCPTT client, and
receive, from the second MCPTT client, an MCPTT response message in response to the MCPTT request message,
wherein the MCPTT request message is one of an MCPTT call back request message requesting the second MCPTT client to place a first MCPTT call to the first MCPTT client or an MCPTT remotely initiated call request message allowing the second MCPTT client to initiate a second MCPTT call without the second MCPTT client's user initiating the second MCPTT call,
wherein the MCPTT call back request message comprises information for urgency level of the MCPTT call back request message and information for time of the MCPTT call back request message,
wherein the MCPTT remotely initiated call request message comprises an instruction on whether the second MCPTT client's user is notified or not, and
wherein the first MCPTT call and the second MCPTT call are established between the first MCPTT client and the second MCPTT client based on the MCPTT request message and the MCPTT response message.

2. The first MCPTT client of claim 1,
wherein the MCPTT call back request message includes priority information, and
wherein the MCPTT response message includes the priority information.

3. The first MCPTT client of claim 2, wherein the second MCPTT client is notified to call back with the priority information including a time at which the first MCPTT client sent the MCPTT call back request message.

4. The first MCPTT client of claim 2,
wherein the second MCPTT client is configured to send an MCPTT call back response message after receiving an input from a user of the second MCPTT client,
wherein the MCPTT call back response message includes an indication corresponding to a calling back functionality, and
wherein the first MCPTT client notifies a user of the first MCPTT client with the indication corresponding to the calling back functionality, in response to the MCPTT call back request message sent to an MCPTT server.

5. The first MCPTT client of claim 1, wherein the MCPTT remotely initiated call request message includes at least one of a private call, priority information, an implicit floor control, a notify indication, a not notify indication, or information related to call back to one of the first MCPTT client or a third MCPTT client.

6. The first MCPTT client of claim 5, wherein the MCPTT response message includes at least one of the priority information or an implicit floor request.

7. The first MCPTT client of claim 5,
wherein the MCPTT response message is sent autonomously by the second MCPTT client without obtaining an input from a user of the second MCPTT client when the MCPTT remotely initiated call request message includes the not notify indication, and
wherein the MCPTT response message is sent after receiving the input from the user of the second MCPTT client, when the MCPTT remotely initiated call request message includes the notify indication.

8. The first MCPTT client of claim 1, wherein the first MCPTT client is configured to notify a user of the first MCPTT client with an indication of the MCPTT response message, in response to the MCPTT remotely initiated call request message sent to an MCPTT server.

9. The first MCPTT client of claim 1, wherein the MCPTT remotely initiated call request message includes at least one of a private call, priority information, an implicit floor control, a notify indication, a not notify indication, or a group identifier (ID).

10. The first MCPTT client of claim 9,
wherein the MCPTT response message includes at least one of the priority information, the group ID, or an implicit floor request, and
wherein an MCPTT server is configured to identify one or more MCPTT clients in a group associated with the group ID.

11. The first MCPTT client of claim 10, wherein the MCPTT server is configured to notify one or more users of the one or more MCPTT clients with an indication of the MCPTT response message, in response to the MCPTT remotely initiated call request message sent by the MCPTT server.

12. The first MCPTT client of claim 9, wherein the MCPTT response message is sent autonomously by the second MCPTT client without obtaining an input from a user of the second MCPTT client when the MCPTT remotely initiated call request message includes the not notify indication.

13. The first MCPTT client of claim 9,
wherein the MCPTT response message is sent after receiving an input from a user of the second MCPTT client, when the MCPTT remotely initiated call request message includes the notify indication, and
wherein the first MCPTT client is configured to notify a user of the first MCPTT client with an indication of the MCPTT response message, in response to the MCPTT remotely initiated call request message sent to an MCPTT server.

14. A method for managing a Mission Critical Push-to-Talk (MCPTT) service by the first MCPTT client, the method comprising:
transmitting an MCPTT request message to a second MCPTT client; and
receiving, from the second MCPTT client, an MCPTT response message in response to the MCPTT request message,
wherein the MCPTT request message is one of an MCPTT call back request message requesting the second MCPTT client to place a first MCPTT call to the first MCPTT client or an MCPTT remotely initiated call request message allowing the second MCPTT client to initiate a second MCPTT call without the second MCPTT client's user initiating the second MCPTT call, wherein the MCPTT call back request message comprises information for urgency level of the MCPTT call back request message and information for time of the MCPTT call back request message, wherein the MCPTT remotely initiated call request message comprises an instruction on whether the second MCPTT client's user is notified or not, and wherein the first MCPTT call and the second MCPTT call are established between the first MCPTT client and the second MCPTT client based on the MCPTT request message and the MCPTT response message.

15. The method of claim 14, wherein the MCPTT call back request message includes priority information, and wherein the MCPTT response message includes the priority information.

16. The method of claim 15, wherein the second MCPTT client is notified to call back with the priority information including a time at which the first MCPTT client sent the MCPTT call back request message.

17. The method of claim 15, wherein the second MCPTT client is configured to send an MCPTT call back response message after receiving an input from a user of the second MCPTT client, wherein the MCPTT call back response message includes an indication corresponding to a calling back functionality, and wherein the first MCPTT client notifies a user of the first MCPTT client with the indication corresponding to the calling back functionality, in response to the MCPTT call back request message sent to an MCPTT server.

18. The method of claim 14, wherein the MCPTT remotely initiated call request message includes at least one of a private call, priority information, an implicit floor control, a notify indication, a not notify indication, or information related to call back to one of the first MCPTT client or a third MCPTT client.

19. The method of claim 14, wherein the first MCPTT client is configured to notify a user of the first MCPTT client with an indication of the MCPTT response message, in response to the MCPTT remotely initiated call request message sent to an MCPTT server.

20. The method of claim 14, wherein the MCPTT remotely initiated call request message includes at least one of a private call, priority information, an implicit floor control, a notify indication, a not notify indication, or a group identifier (ID).

* * * * *